US010482445B2

(12) United States Patent
Gotanda et al.

(10) Patent No.: US 10,482,445 B2
(45) Date of Patent: Nov. 19, 2019

(54) CHECKOUT SYSTEM AND METHOD

(71) Applicant: TOSHIBA TEC KABUSHIKI KAISHA, Tokyo (JP)

(72) Inventors: Tsuyoshi Gotanda, Tokyo (JP); Akiko Susaki, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 508 days.

(21) Appl. No.: 15/246,794

(22) Filed: Aug. 25, 2016

(65) Prior Publication Data

US 2017/0076268 A1 Mar. 16, 2017

(30) Foreign Application Priority Data

Sep. 14, 2015 (JP) .................................. 2015-180883

(51) Int. Cl.
G06Q 20/20 (2012.01)
G06Q 20/10 (2012.01)
(Continued)

(52) U.S. Cl.
CPC ....... *G06Q 20/204* (2013.01); *G06Q 20/0453* (2013.01); *G06Q 20/102* (2013.01);
(Continued)

(58) Field of Classification Search
None
See application file for complete search history.

(56) References Cited

U.S. PATENT DOCUMENTS 5,924,080 A * 7/1999 Johnson ................. G06Q 20/20
725/138

FOREIGN PATENT DOCUMENTS

EP 1528519 A2 5/2005
JP 2001-250169 A 9/2001
(Continued)

OTHER PUBLICATIONS

Japanese Office Action filed Dec. 19, 2017 in counterpart Japanese Patent Application No. 2015-180883 (6 pages) (with machine translation).
(Continued)

*Primary Examiner* — Nathan A Mitchell
*Assistant Examiner* — Denisse Y Ortiz Roman
(74) *Attorney, Agent, or Firm* — Kim & Stewart LLP

(57) ABSTRACT

A checkout system includes at least one input apparatus and at least one controller. The input apparatus receives an input indicating that a plurality of transactions are consecutively performed by a single customer. The input apparatus receives input of merchandise information for the plurality of transactions. The input apparatus also receives an input of a user code corresponding to a service. The at least one controller generates payment information indicating a total amount to be paid for each transaction of the plurality of transactions based on the input merchandise information. The user code is applied in connection with payment processing for each of the plurality of transactions without requiring the user code to be input more than once. Payment processing is performed with respect to each of the plurality of transactions based on the corresponding payment information, in accordance with a payment operation of the single customer.

20 Claims, 10 Drawing Sheets

(51) Int. Cl.
     *G06Q 20/04*          (2012.01)
     *G07G 1/14*           (2006.01)
     *G06Q 20/38*          (2012.01)

(52) U.S. Cl.
     CPC ......... *G06Q 20/202* (2013.01); *G06Q 20/387* (2013.01); *G07G 1/14* (2013.01)

(56) References Cited

FOREIGN PATENT DOCUMENTS

| | | |
|---|---|---|
| JP | 2004-318259 | 11/2004 |
| JP | 2011-065240 | 3/2011 |
| JP | 2011-248659 A | 12/2011 |
| JP | 2013-242839 A | 12/2013 |
| JP | 2014-222390 | 11/2014 |

OTHER PUBLICATIONS

Extended European Search Report filed Feb. 16, 2017 in counterpart European Patent Application No. 16187628.9 (11 pages).

* cited by examiner

US 10,482,445 B2

CHECKOUT SYSTEM AND METHOD

CROSS-REFERENCE TO RELATED APPLICATION

This application is based upon and claims the benefit of priority from Japanese Patent Application No. 2015-180883, filed Sep. 14, 2015, the entire contents of which are incorporated herein by reference.

FIELD

Embodiments described herein relate generally to a checkout system and method.

BACKGROUND

A shopper may desire to checkout a plurality of commercial transactions at a time in a supermarket or the like. For example, the shopper may carry two shopping baskets, in each of which merchandise is put, to a checkout area and may request a receipt for each shopping basket.

In such a case, in general, each of a plurality of transactions are processed individually and consecutively in a conventional checkout system. In the following, such a checkout processing operation is referred to as a "consecutive transaction."

Furthermore, a service may be provided at the time of a transaction in association with a user code. For example, as the service, a point service may be applied when processing a transaction in the checkout system. Accordingly, the checkout system acquires the user code during each transaction to apply the service described above.

In such cases, when the checkout is performed as described above, the user is required to repeatedly provide the user code for each transaction. Thus, when the consecutive transaction and application of the service are carried out together, performing the operation is troublesome.

DETAILED DESCRIPTION

According to embodiments, there is provided a checkout system capable of reducing time and effort of an operator when a consecutive transaction and an application of a service in association with a user code are carried out together.

A checkout system includes at least one input apparatus and at least one controller. The input apparatus receives an input indicating that a plurality of transactions are consecutively performed by a single customer. The input apparatus receives input of merchandise information for the plurality of transactions. The input apparatus also receives an input of a user code corresponding to a service available to the single customer. The at least one controller generates payment information indicating a total amount to be paid for each transaction of the plurality of transactions based on the input merchandise information. The user code is applied in connection with payment processing for each of the plurality of transactions without requiring the user code to be input more than once. Payment processing is performed with respect to each of the plurality of transactions based on the corresponding payment information, in accordance with a payment operation of the single customer.

Hereinafter, description will be made on an example of an embodiment with reference to the accompanying drawings.

Figure 1:
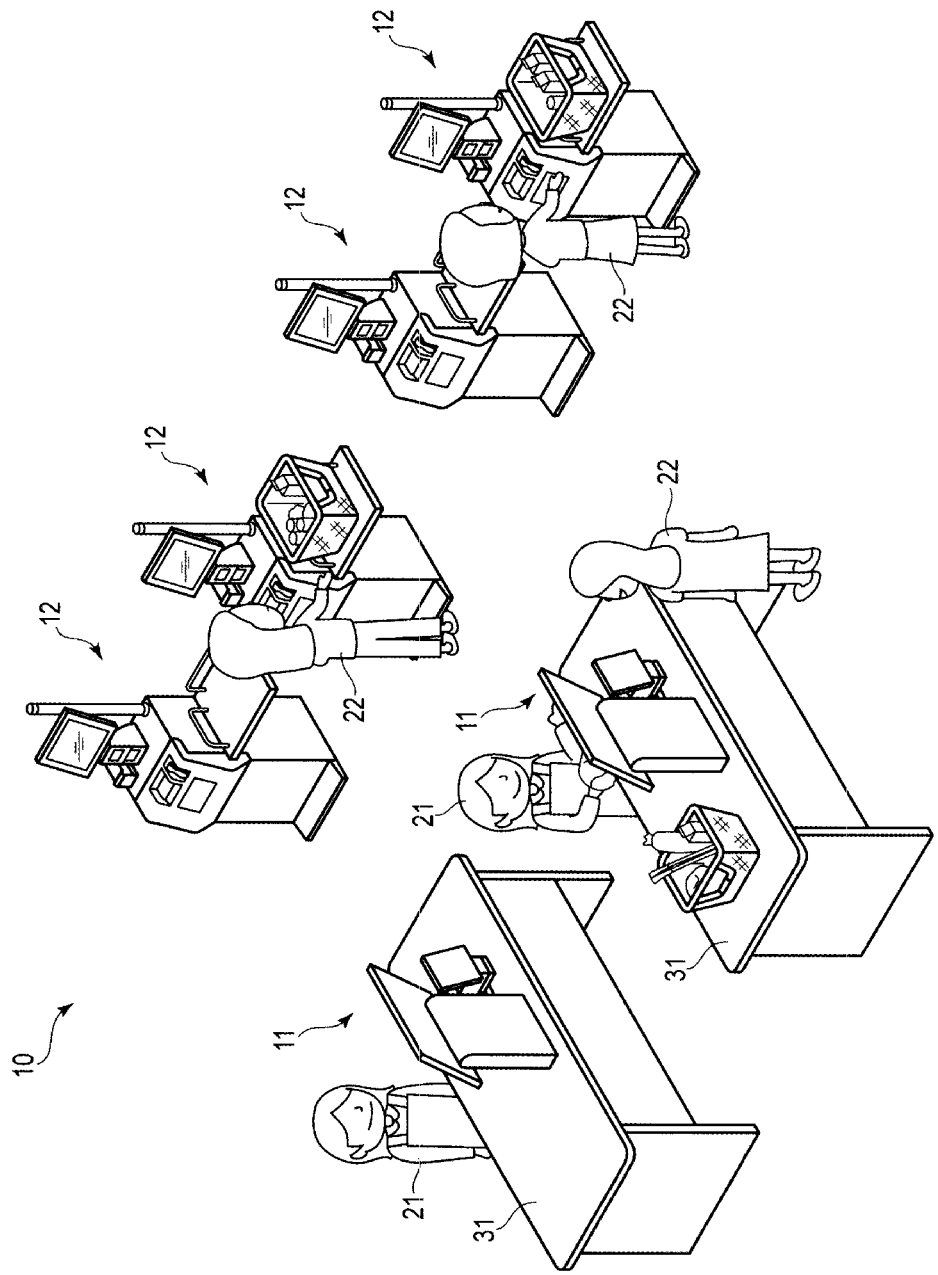
FIG. 1 is a perspective view of a checkout system according to an embodiment.

FIG. 1 is a perspective view of a checkout system 10 according to an embodiment.

The checkout system 10 includes at least one merchandise registration apparatus 11 and at least one payment apparatus 12. In FIG. 1, the checkout system 10 including two merchandise registration apparatuses 11 and four payment apparatuses 12 is illustrated. The number of merchandise registration apparatuses 11 and payment apparatuses 12 may be arbitrary. The merchandise registration apparatus 11 is an example of a registration apparatus.

The merchandise registration apparatus 11 and the payment apparatus 12 are arranged at a checkout area of a store such as a supermarket.

The merchandise registration apparatus 11 is operated by an employee 21, called a checker, of the store. The payment apparatus 12 is operated by a shopper 22 who purchases merchandise sold in the store. However, the shopper 22 may perform a portion of an operation for the merchandise registration apparatus 11. The employee may also operate the payment apparatus 12.

The merchandise registration apparatus 11 is mounted on a work table 31 in FIG. 1. The work table 31 includes a rectangular top surface. A plurality of work tables 31 are arranged to be substantially parallel in the longitudinal direction of the top surface to form a passage for the shopper 22.

The merchandise registration apparatus 11 performs various functions including: merchandise registration, generating payment information, payment processing, and transmitting the payment information to the payment apparatus 12. The merchandise registration is a process for the shopper 22 to register the merchandise for purchase. The payment process receives payment for the purchased merchandise. The payment information is required for the payment process.

When the payment information is transmitted from the merchandise registration apparatus 11, the payment apparatus 12 performs the payment processing based on the payment information.

Figure 2:
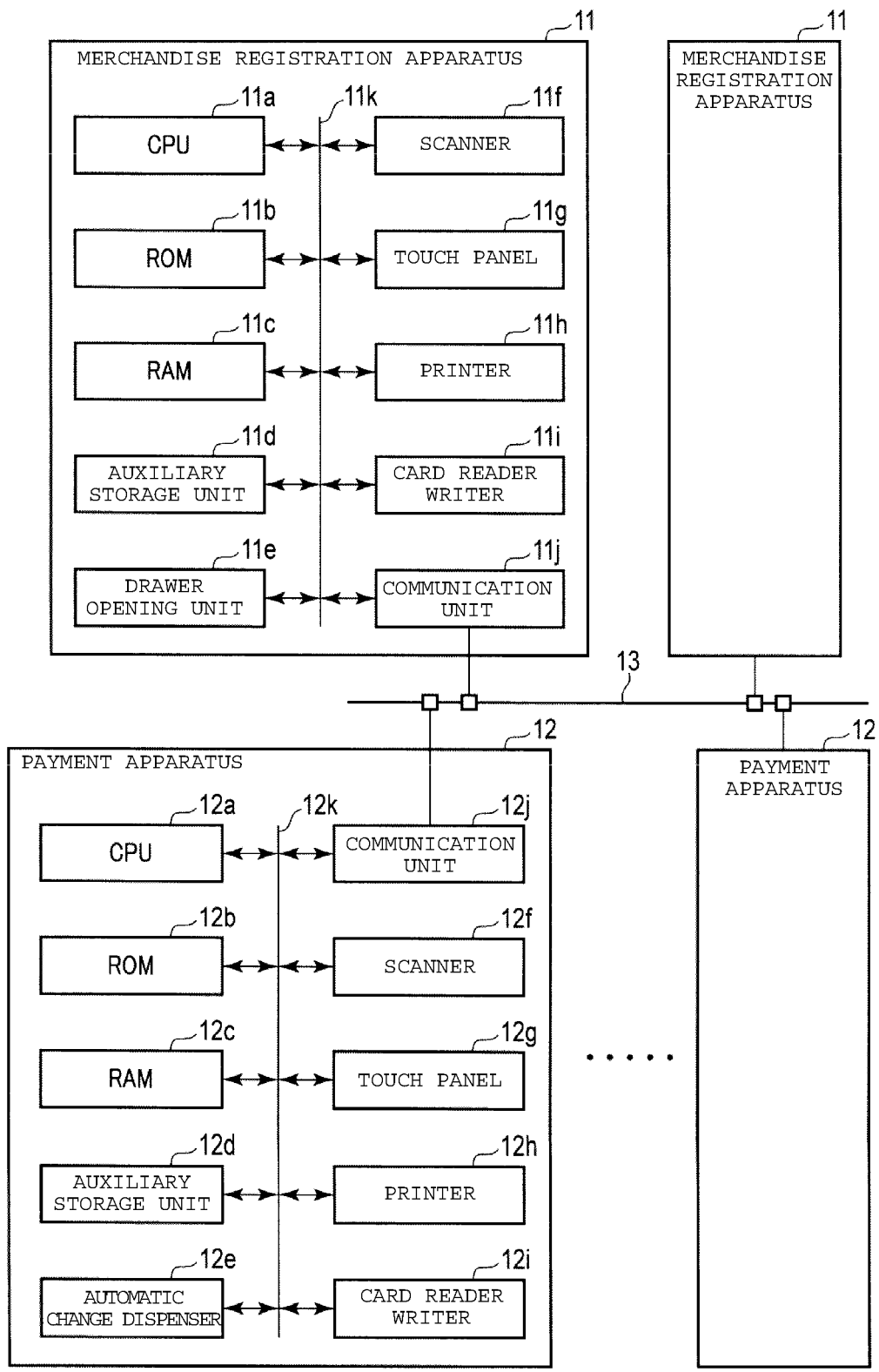
FIG. 2 is a block diagram illustrating a circuit configuration of main parts of a registration apparatus and a payment apparatus of the checkout system of FIG. 1.

FIG. 2 is a block diagram illustrating a circuit configuration of main parts of the merchandise registration apparatus 11 and the payment apparatus 12.

Both of the merchandise registration apparatus 11 and the payment apparatus 12 are connected to a network such as a local area network (LAN) 13. A separate communication network such as the Internet or the wireless LAN may be utilized instead of the LAN 13. Likewise, any configuration in which information is communicated between the merchandise registration apparatus 11 and the payment apparatus 12 through a server may be adopted.

The merchandise registration apparatus 11 includes a central processing unit (CPU) 11a, a read-only memory (ROM) 11b, a random-access memory (RAM) 11c, an auxiliary storage unit 11d, a drawer opening unit 11e, a scanner 11f, a touch panel 11g, a printer 11h, a card reader writer 11i, a communication unit 11j, and a transfer system 11k.

The CPU 11a, the ROM 11b, the RAM 11c, and the auxiliary storage unit 11d are connected with each other by the transfer system 11k, and may be provided as a computer.

The CPU 11a corresponds to a main controller of the computer. The CPU 11a controls respective units so as to implement various operations as the merchandise registration apparatus 11 based on an operating system, middleware, and an application program stored in the ROM 11b and RAM 11c. Thus, the CPU 11a functions as a controller for the units of the registration apparatus 11.

The ROM 11b corresponds to a main memory of the computer. The ROM 11b stores the operating system. The ROM 11b may also store the middleware and the application program. The ROM 11b may also store data referenced in various processing performed by the CPU 11a.

The RAM 11c corresponds to a main working memory of the computer. The RAM 11c stores data referenced in various processing performed by the CPU 11a. Furthermore, the RAM 11c stores data temporarily used in various processing performed by the CPU 11a, and is used as a so-called work area.

The auxiliary storage unit 11d corresponds to an auxiliary storage of the computer. The auxiliary storage unit 11d saves data used in various processing performed by the CPU 11a or data generated in processing performed by the CPU 11a. For example, an electric erasable programmable read-only memory (EEPROM), a hard disk drive (HDD), a solid state drive (SSD) or the like may be used as the auxiliary storage unit 11d.

The application program stored in the ROM 11b or the auxiliary storage unit 11d includes a control program written for a control process which will be described later. The merchandise registration apparatus 11 is generally installed in a state where the control program is stored in the ROM 11b or the auxiliary storage unit 11d. However, the merchandise registration apparatus 11 may also be installed in a state where the control program is not stored in the ROM 11b or the auxiliary storage unit 11d. The control program may be stored in a removable recording medium such as a magnetic disk, an opto-magnetic disk, an optical disk, or a semiconductor memory, or through a network. In such a case, he control program may be loaded through the auxiliary storage unit 11d of the merchandise registration apparatus 11 under operation of a user.

The drawer opening unit 11e automatically opens a drawer for accommodating money.

The scanner 11f reads merchandise information to obtain a merchandise code of the merchandise. The scanner 11f may be a single type of scanner or a plurality of types of scanners. That is, the scanner 11f may be a fixed or a hand-held two dimensional code scanner. The scanner 11f may also be a type of scanner that identifies merchandise using an image recognition technique.

The touch panel 11g includes a display apparatus and a touch sensor. The display apparatus displays an arbitrary screen such as a GUI screen. For example, a color LCD may be utilized as the display apparatus. The touch sensor is arranged overlapping with a display surface of the display apparatus. The touch sensor detects a touch position of the display surface on the display apparatus by an operator and sends the positional information to the CPU 11a.

The printer 11h is, for example, a thermal printer or a dot impact printer, and prints various character strings, images or the like to a receipt sheet to issue a receipt.

The card reader writer 11i reads data recorded on a card and writes data to the card. The card may be any of various cards in which information relating to payment processing is recorded, such as a membership card and a point card, or a card for payment such as a credit card, a debit card, electronic money card, and a prepaid card. The card reader writer 11i may be any of a magnetic device, a contact device, or a contactless device, or may incorporate a plurality of types of devices.

The communication unit 11j performs communication through the LAN 13.

The transfer system 11k transfers data communicated between the CPU 11a, the ROM 11b, the RAM 11c, the auxiliary storage unit 11d, the drawer opening unit 11e, the scanner 11f, the touch panel 11g, the printer 11h, the card reader writer 11i, and the communication unit 11j. Various buses such as a system bus and various interface circuits connecting the buses and each unit may be used as the transfer system 11k.

A POS terminal may be used as hardware of the merchandise registration apparatus 11.

The payment apparatus 12 includes a CPU 12a, a ROM 12b, a RAM 12c, an auxiliary storage unit 12d, an automatic change dispenser 12e, a scanner 12f, a touch panel 12g, a printer 12h, a card reader writer 12i, a communication unit 12j, and a transfer system 12k.

The CPU 12a, the ROM 12b, the RAM 12c, and the auxiliary storage unit 12d are connected with each other by the transfer system 12k and may be provided as a computer.

The CPU 12a corresponds to a main controller of the computer. The CPU 12a controls respective units so as to implement various operations as the payment apparatus 12 based on an operating system, middleware, and an application program stored in the ROM 12b and RAM 12c. Thus the CPU 12a functions as a controller of the payment apparatus 12.

The ROM 12b corresponds to a main memory of the computer. The ROM 12b stores the operating system. The ROM 12b may also store the middleware and the application program. The ROM 12b may also store data referenced in various processing performed by the CPU 12a.

The RAM 12c corresponds to a main working memory of the computer. The RAM 12c stores data referenced in various processing performed by the CPU 12a. Furthermore, the RAM 12c stores data temporarily used in various processing performed by the CPU 12a, and are used as a so-called work area.

The auxiliary storage unit 12d corresponds to an auxiliary storage of the computer. The auxiliary storage unit 12d saves data used in various processing performed by the CPU 12a or data generated in processing performed by the CPU 12a. For example, an EEPROM, an HDD, an SSD or the like may be used as the auxiliary storage unit 12d.

The application program stored in the ROM 12b or the auxiliary storage unit 12d includes a control program written for a control process which will be described later. The payment apparatus 12 is generally installed in a state where the control program is stored in the ROM 12b or the auxiliary storage unit 12*d*. However, the payment apparatus 12 may also installed in a state where the control program is not stored in the ROM 12*b* or the auxiliary storage unit 12*d*. The control program stored in a removable recording medium such as a magnetic disk, an opto-magnetic disk, an optical disk, or a semiconductor memory, or through a network. Thus, the control program may be loaded through the auxiliary storage unit 12*d* of the payment apparatus 12 under operation of a user.

The automatic change dispenser 12*e* receives an inserted coin and paper money. The automatic change dispenser 12*e* discharges a coin and a paper money as change.

The scanner 12*f* reads merchandise information to obtain a merchandise code of the merchandise. The scanner 12*f* may be a single type of scanner, or a plurality of types of scanners. That is, the scanner 12*f* may be a fixed or a hand-held two dimensional code scanner. The scanner 12*f* may also be a type of scanner that identifies merchandise using an image recognition technique.

The touch panel 12*g* includes a display apparatus and a touch sensor. The display apparatus displays an arbitrary screen such as a GUI screen. For example, a color LCD may be utilized as the display apparatus. The touch sensor is arranged overlapping a display surface of the display apparatus. The touch sensor detects a touch position of the display surface on the display apparatus by an operator and sends the positional information to the CPU 12*a*.

The printer 12*h* is, for example, a thermal printer or a dot impact printer, and prints various character strings and images to a receipt sheet to issue a receipt.

The card reader writer 12*i* reads data recorded on a card and writes data to the card. The card may be any of various cards in which information relating to payment processing is recorded, such as a membership card and a point card, or a card for payment such as a credit card, a debit card, electronic money card, and a prepaid card. The card reader writer 12*i* may be any of a magnetic device, a contact device, or a contactless device, or may incorporate a plurality of types of devices.

The communication unit 12*j* performs communication through the LAN 13.

The transfer system 12*k* transfers data communicated between the CPU 12*a*, the ROM 12*b*, the RAM 12*c*, the auxiliary storage unit 12*d*, the automatic change dispenser 12*e*, the scanner 12*f*, the touch panel 12*g*, the printer 12*h*, the card reader writer 12*i*, and the communication unit 12*j*. Various buses such as a system bus and various interface circuits connecting the buses and each unit may be used as the transfer system 12*k*.

A POS terminal may be used as hardware of the payment apparatus 12.

Next, description will be made with respect to an operation of the checkout system 10 configured as described above. The content of processing which will be described in the following is an example, and various processing capable of obtaining the same result may be appropriately utilized.
Operation of Merchandise Registration Apparatus 11

When the merchandise registration apparatus 11 is started in registration processing mode, the CPU 11*a* starts a control process according to a control program stored in the ROM 11*b* or the auxiliary storage unit 11*d*.

Figure 3:
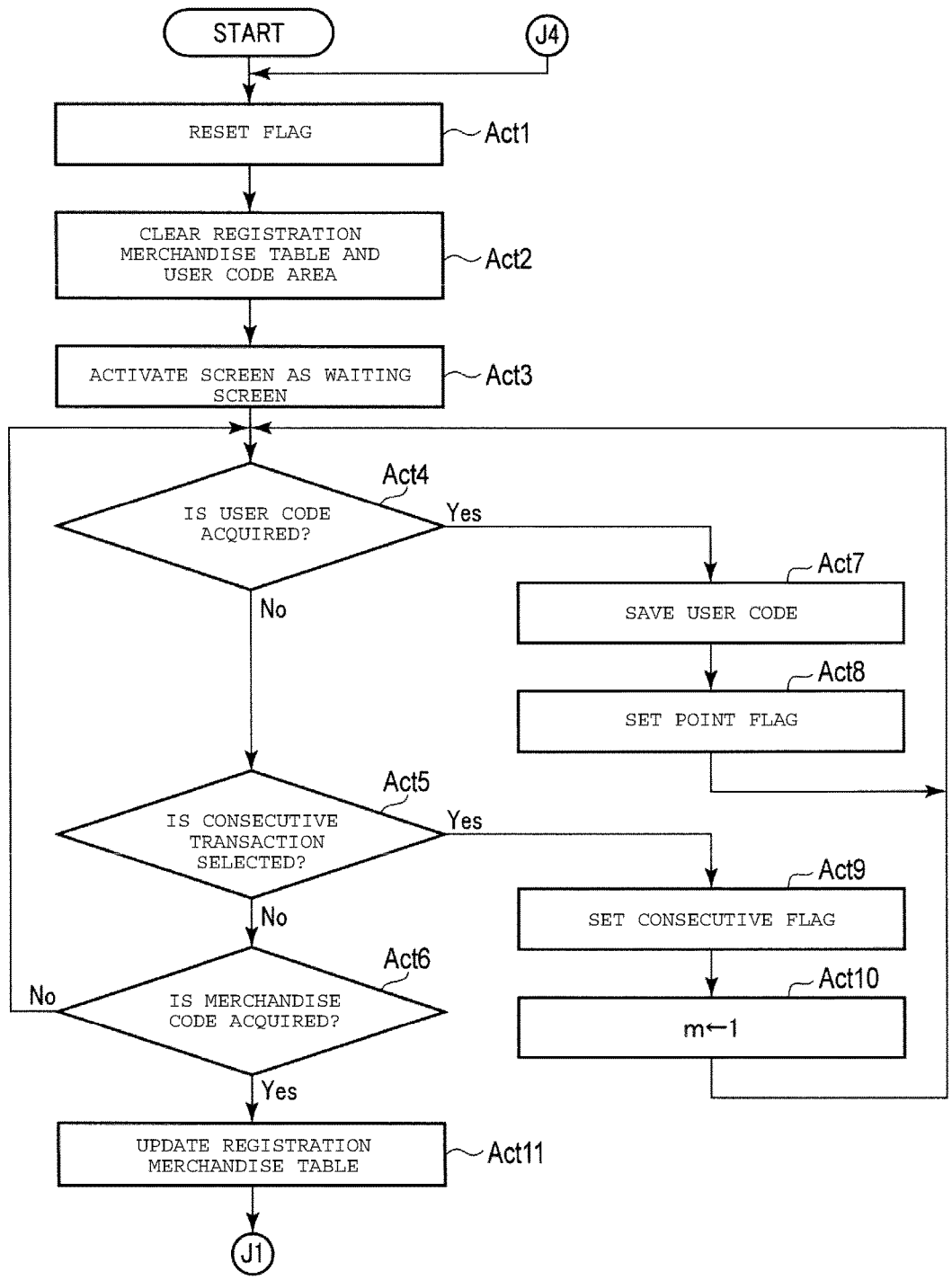
FIG. 3 is a flowchart of a control process of a CPU included in the registration apparatus of FIG. 2.
Figure 4:
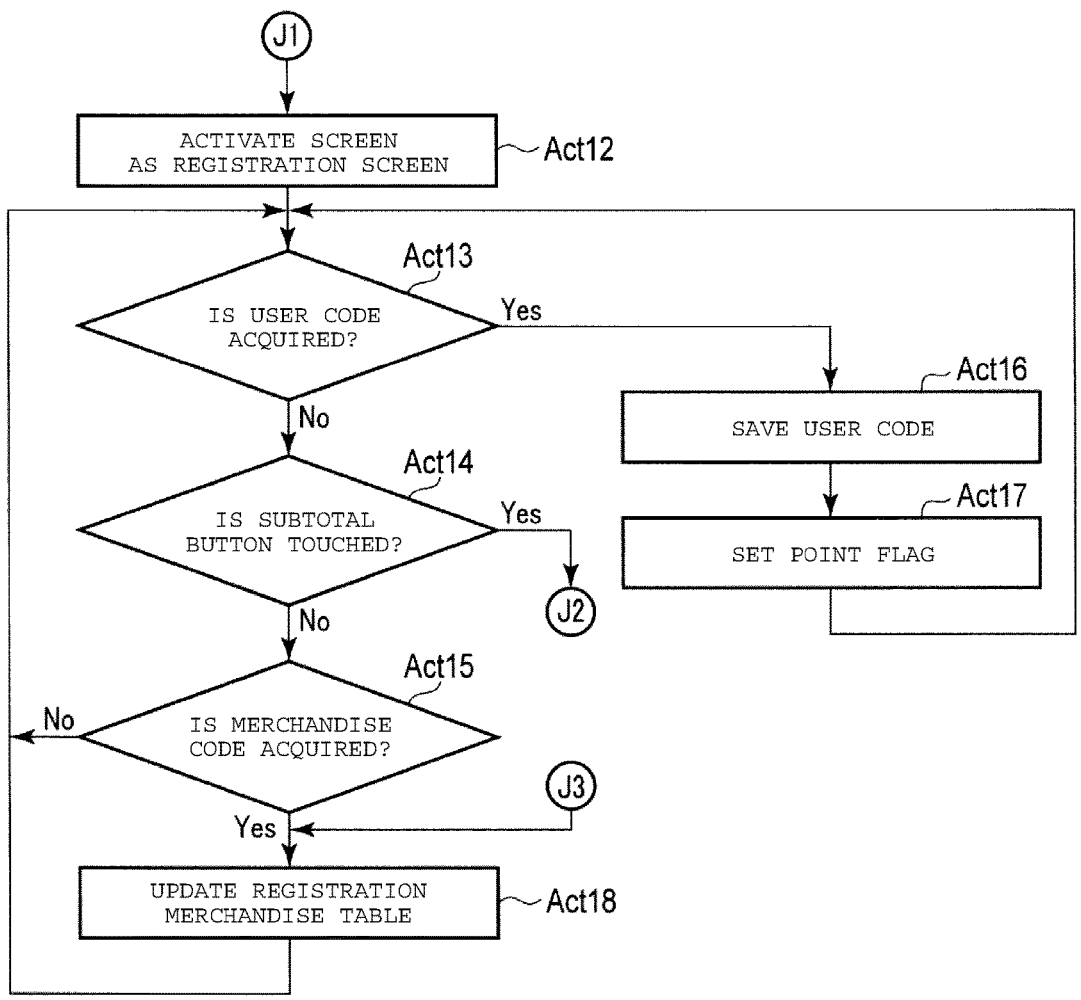
FIG. 4 is another flowchart of the control process of the CPU included in the registration apparatus of FIG. 2.
Figure 5:
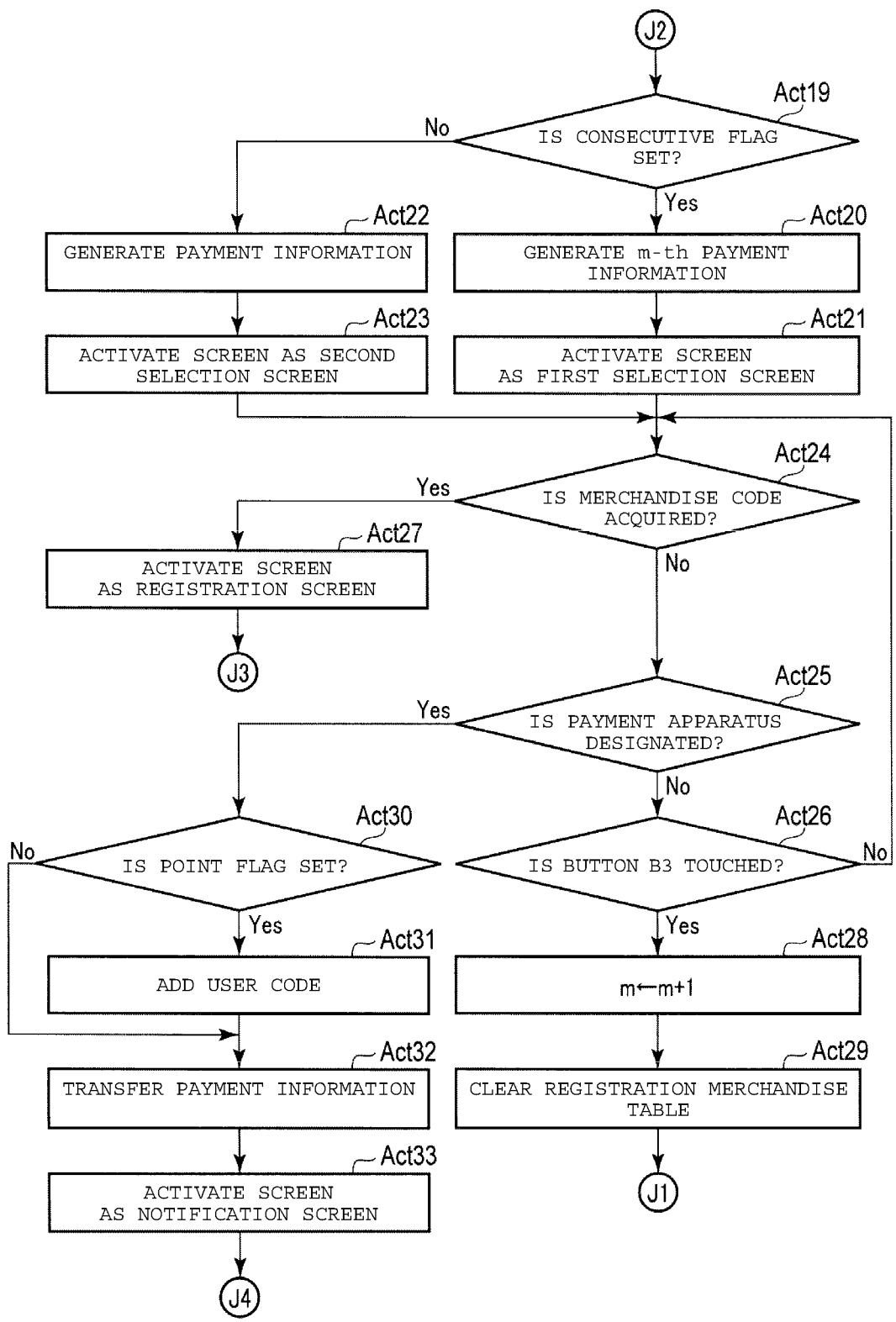
FIG. 5 is another flowchart of the control process of the CPU included in the registration apparatus of FIG. 2.

FIG. 3 to FIG. 5 are flowcharts of the control process of the CPU 11*a*.

In Act 1, the CPU 11*a* resets a consecutive flag and a point flag. The consecutive flag indicates that consecutive transactions are being performed by a single user. The point flag indicates that the point service is applied. Both of the consecutive flag and the point flag may be implemented as 1-bit data in the RAM 11*c*, for example.

In Act 2, the CPU 11*a* clears a registration merchandise table and a user code area which are set in the RAM 11*c* or the auxiliary storage unit 11*d*. The registration merchandise table is a data table that includes merchandise information related to the merchandise for which the purchase registration is completed. The user code is stored in the user code area.

In Act 3, the CPU 11*a* activates a portion of a region of a screen of the touch panel 11*g* as a waiting screen.

Figures 6, 7:
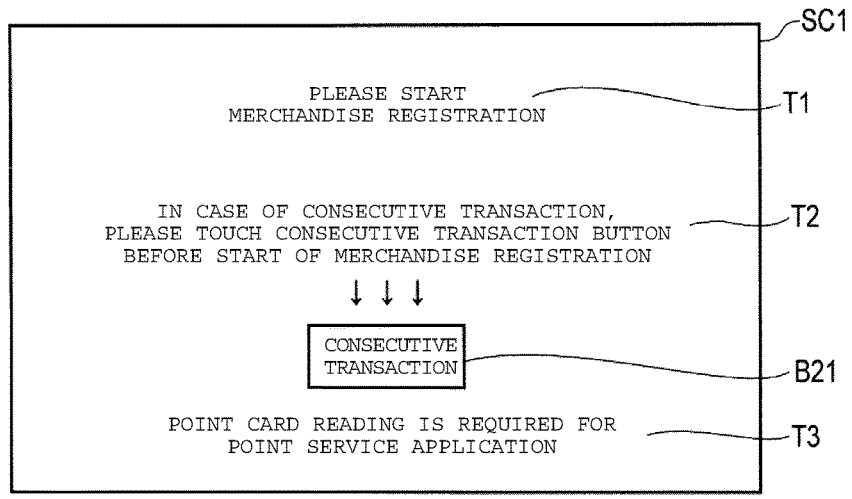
FIG. 6 illustrates an example of a waiting screen.
FIG. 7 illustrates an example of a registration screen.

FIG. 6 is a diagram illustrating an example of a waiting screen SC1.

The waiting screen SC1 includes texts T1, T2, and T3, and a button B21.

The text T1 communicates that the employee 21 needs to start registering the purchased merchandise. The text T2 communicates that the employee 21 needs to touch the button B21 before registering the purchased merchandise when consecutive transactions are being performed. The text T3 communicates that the employee 21 needs to cause the point card to be read by the card reader writer 11*i* when the point service is applied with respect to the transaction.

In Act 4, the CPU 11*a* confirms whether the user code is acquired. The user code is a unique code for identifying a point service user. When the user code is not acquired, the result is No and the CPU 11*a* proceeds to Act 5.

In Act 5, the CPU 11*a* confirms whether the instruction to execute the consecutive transaction is issued. When the instruction is not issued, the result is No and the CPU 11*a* proceeds to Act 6.

In Act 6, the CPU 11*a* confirms whether a merchandise code of the merchandise to be registered is acquired. When the merchandise code is not acquired, the result is No and the CPU 11*a* returns to Act 4.

In Act 4 to Act 6, the CPU 11*a* waits for an acquisition of the user code, the instruction to carry out consecutive transactions, or an acquisition of the merchandise code. The CPU 11*a* may confirm occurrence of other events as well, such as performing of other operations and idle state processing.

When the shopper 22 decides to apply the point service, the employee 21 takes the shopper's point card and causes the card reader writer 11*i* to read the point card. Alternatively, the shopper 22 causes the card reader writer 11*i* to read the point card. The point card is possessed by a user of the point service and has a user code allocated to the user. When the card reader writer 11*i* reads the user code from the point card, the card reader writer 11*i* provides the user code to the CPU 11*a*. The card reader writer 11*i* is an example of an acquisition section. The CPU 11*a* which receives the user code determines the result in Act 4 as Yes and proceeds to Act 7. The user code may also be acquired by user entry using the touch panel 11*g*. In this case, the touch panel 11*g* is an example of the acquisition section.

In Act 7, the CPU 11*a* saves the user code provided by the card reader writer 11*i* in a user code area of the RAM 11*c* or the auxiliary storage unit 11*d*. When a user code has been already saved in the user code area, the user code area is overwritten with the new user code.

In Act 8, the CPU 11*a* sets the point flag. Thereafter, the CPU 11*a* returns to a state waiting for Act 4 to Act 6.

When the shopper 22 requests consecutive transactions, the employee 21 performs and operation such as touching the button B21 to issue an instruction to carry out consecutive transactions. When such operation is detected by, for example, the touch panel 11g, the CPU 11a determines that the result in Act 5 is Yes and proceeds to Act 9.

In Act 9, the CPU 11a sets the consecutive flag.

The CPU 11a executes the control process based on the control program. Thus, the computer, which includes the CPU 11a as the main controller, cooperates with the touch panel 11g, thereby functioning as a determination unit.

In Act 10, the CPU 11a sets "1" as a value of a variable m. The variable m is used for counting the number of commercial transactions within the consecutive transaction. Thereafter, the CPU 11a returns to a state waiting for Act 4 to Act 6.

The CPU 11a may also acquire merchandise codes by action of the employee 21. When the merchandise code is acquired, the CPU 11a determines that the result in Act 6 is Yes and proceeds to Act 11.

In Act 11, the CPU 11a updates the registration merchandise table to include the acquired merchandise code. Thereafter, the CPU 11a proceeds to Act 12 in FIG. 4. When consecutive transactions are not selected, the CPU 11a maintains the consecutive flag in the reset state.

In Act 12, the CPU 11a activates a portion of the screen of the touch panel 11g as a registration screen. The registration screen represents the contents of the registration merchandise table or the like and allows the employee 21 to confirm the registration.

FIG. 7 is a diagram illustrating an example of a registration screen SC2.

The registration screen SC2 includes Region R1 and Region R2.

Region R1 displays a merchandise name, the number of items, and a unit price related to merchandise which was most recently subjected to the purchase registration, and a total number of items and a total amount of money of the purchased merchandise after the merchandise is registered. Region R2 displays a list of a merchandise name, the number of items, a unit price, and an amount of money related to the merchandise which was previously subjected to the purchase registration.

The registration screen SC2 indicates various information related to the registered merchandise. However, when the CPU 11a proceeds from Act 8 to Act 12, the registration merchandise table does not include all information related to the registered merchandise. For that reason, the registration screen does not display all information related to the merchandise and represents only a basic form determined in advance. When the CPU 11a proceeds from Act 11 to Act 12, the registration merchandise table includes only information related to a single merchandise item. For that reason, the registration screen displays the information related to the merchandise in the Region R2 but does not display information related to the merchandise item in the Region R1.

Although the CPU 11a causes various functional buttons, such as a merchandise button used for designating the merchandise by the employee 21, a subtotal button, or the like, to be displayed in a portion other than the region serving as the registration screen in the screen of the touch panel 11g, such buttons are omitted in the figure.

In Act 13 in FIG. 3, the CPU 11a confirms whether the user code is acquired. When the user code is not acquired, the result is No and the CPU 11a proceeds to Act 14.

In Act 14, the CPU 11a confirms whether the subtotal button displayed in the screen of the touch panel 11g is touched. When it is not detected by the touch panel 11g that the subtotal button is touched, the result is No and the CPU 11a proceeds to Act 15.

In Act 15, the CPU 11a confirms whether a merchandise code of merchandise to be registered is acquired. When the merchandise code is not acquired, the result is No and the CPU 11a returns to Act 13.

In Act 13 to Act 15, the CPU 11a waits for an acquisition of the user code, touching of the subtotal button, or an acquisition of the merchandise code. The CPU 11a may confirm occurrence of other events and may perform other idle state processing.

When the card reader writer 11i reads the user code from the point card and provides the user code to the CPU 11a, the CPU 11a determines that the result in Act 13 is Yes and proceeds to Act 16.

In Act 17, the CPU 11a saves the user code received from the card reader writer 11i in the user code area of the RAM 11c or the auxiliary storage unit 11d. When a user code has been already saved in the user code area, the user code area is overwritten with the new user code.

In Act 18, the CPU 11a sets the point flag. Thereafter, the CPU 11a returns to a state of waiting for Act 13 to Act 1.

When the merchandise code is acquired, the CPU 11a determines that the result in Act 15 is Yes and proceeds to Act 18.

In Act 18, the CPU 11a updates the registration merchandise table to include the acquired merchandise code. The CPU 11a updates the registration screen with the contents of the updated registration merchandise table. Thereafter, the CPU 11a returns to a state of waiting for Act 13 to Act 15.

When the touch panel 11g detects that the subtotal button is touched, the CPU 11a determines that the result in Act 14 is Yes and proceeds to Act 19 in FIG. 5.

In Act 19, the CPU 11a confirms whether the consecutive flag is set. When the consecutive flag is set and, accordingly, the result is Yes, the CPU 11a proceeds to Act 20.

In Act 20, the CPU 11a generates payment information related to the registered merchandise as the m-th payment information, based on the contents of the registration merchandise table at that point in time. The payment information includes at least the list of the registered merchandise. The payment information may include other information such as a total number of items and a total amount of money of the purchased merchandise. The CPU 11a executes the control process based on the control program. Thus, the computer that includes the CPU 11a functions as a generation section.

In Act 21, the CPU 11a activates a portion of the screen of the touch panel 11g as a first selection screen.

Figure 8:
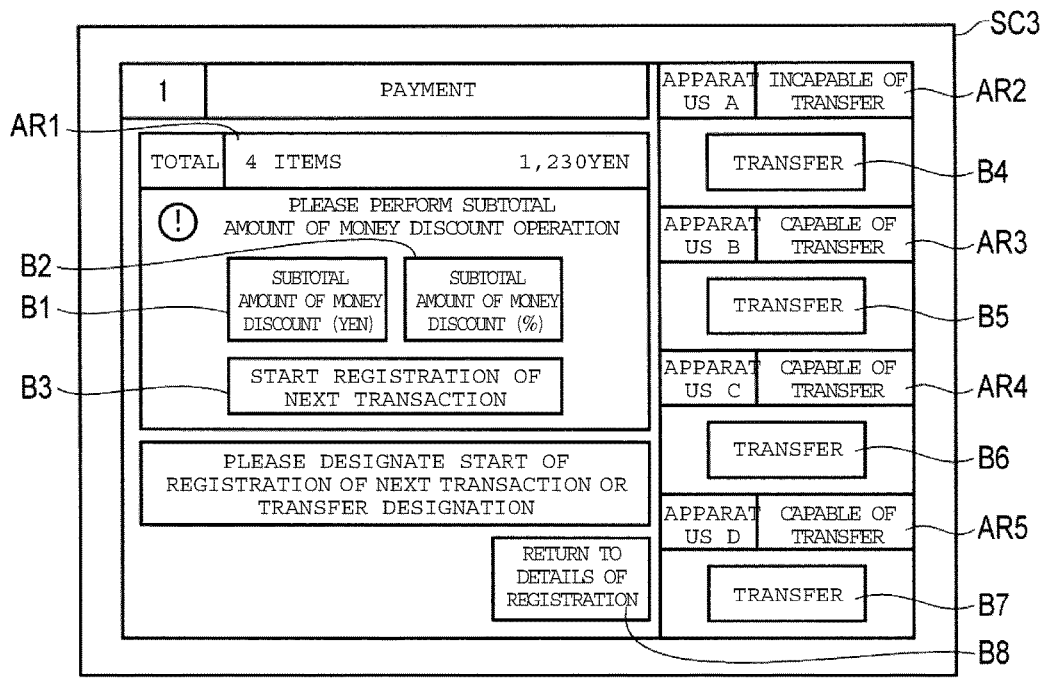
FIG. 8 illustrates an example of a first selection screen.

FIG. 8 is a diagram illustrating an example of a first selection screen SC3.

The first selection screen SC3 includes the display areas AR1, AR2, AR3, AR4, and AR5, and the buttons B1, B2, B3, B4, B5, B6, B7, and B8.

The CPU 11a represents a total number of items and a total amount of money of the purchased merchandise in the display area AR1. The CPU 11a represents whether each transfer of the payment information to each of four payment apparatuses 12 can be performed in the display area AR2 to AR5. The payment apparatus 12 does not accept the transfer of the payment information during execution of the payment processing and the CPU 11a displays "incapable of transfer" in a display area associated with the payment apparatus 12 that is in such a state. That is, in the example screen SC3, only the payment apparatus 12 having a name of a "device A" is executing payment processing for another transaction and therefore cannot accept transfer of payment information for a new transaction. The buttons B4 to B7 may change in appearance according to whether the associated payment apparatus 12 accepts the transfer of the payment information or not, or the buttons B4 to B7 may be removed from the screen SC3 when the associated payment apparatus 12 does not accept the transfer of the payment information The buttons B1 and B2 are used for the employee 21 to designate that a discount is applied to the total amount of money included in the payment information. The button B3 is used for the employee 21 to designate that merchandise registration for the next transaction in a consecutive transaction is started. The buttons B4 to B7 are used for the employee 21 to transfer payment information to each of four payment apparatuses 12. The button B8 is used for the employee 21 to return the screen of the touch panel 11g to the registration screen.

When the consecutive flag is not set and, accordingly, the result in Act 19 is No, the CPU 11a proceeds to Act 22.

In Act 22, the CPU 11a generates the payment information related to the registered merchandise based on the contents of the registration merchandise table at that point in time.

In Act 23, the CPU 11a activates a portion of the screen of the touch panel 11g as a second selection screen.

Figure 9:
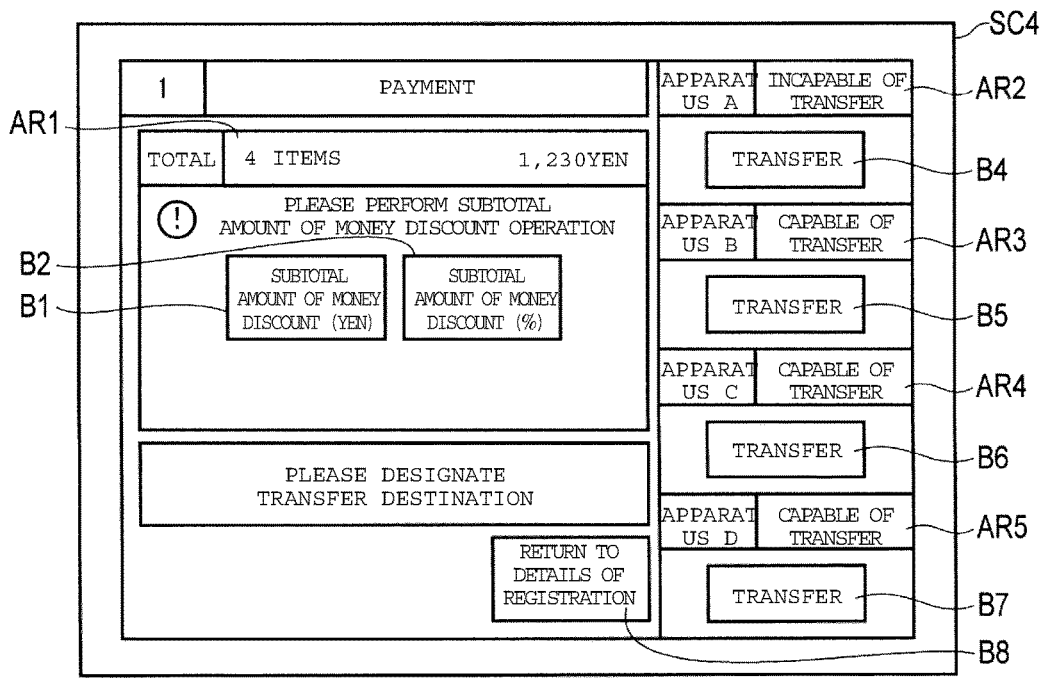
FIG. 9 illustrates an example of a second selection screen.

FIG. 9 is a diagram illustrating an example of a second selection screen SC4. In FIG. 9, the same portions as those in FIG. 8 are denoted by the same reference numerals and detailed description thereof will be omitted.

The second selection screen SC4 includes the display areas AR1, AR2, AR3, AR4, and AR5, and the buttons B1, B2, B4, B5, B6, B7, and B8.

That is, the button B3 included in the first selection screen SC3 is omitted in the second selection screen SC4. Herewith, in the second selection screen SC4, the employee 21 is not able to start registration for a subsequent transaction of a consecutive transaction.

The CPU 11a proceeds to Act 24 after activating the portion of the screen of the touch panel 11g as the first selection screen or the second selection screen in Act 21 or Act 23. The payment information generated in Act 20 or Act 22 is stored in the RAM 11c or the auxiliary storage unit 11d until the payment information is transmitted to one of the payment apparatuses 12 as will be described later.

In Act 24, the CPU 11a confirms whether a merchandise code of merchandise to be registered is acquired. When the merchandise code is not acquired, the result is No and the CPU 11a proceeds to Act 25.

In Act 25, the CPU 11a confirms whether a payment apparatus 12 is designated as a transfer destination of the payment information. When the payment apparatus 12 is not designated, the result is No and the CPU 11a proceeds to Act 26.

In Act 26, the CPU 11a confirms whether the button B3 is touched. When the button B3 is not touched, the result is No and the CPU 11a proceeds to Act 24.

In Act 24 to Act 26, the CPU 11a waits for an acquisition of the merchandise code, the designation of any of the payment apparatuses 12, or the touch of the button B3. When a portion of the screen of the touch panel 11g is activated as the second selection screen, the button B3 does not exist so the button B3 cannot be touched. In such a state, the CPU 11a always determines that the determination result in Act 26 is No. That is, when the consecutive flag is not set while waiting for Act 24 to Act 26, the CPU 11a waits for the acquisition of the merchandise code and the designation of any of the payment apparatuses 12.

Although illustration is omitted, in such a waiting state, the CPU 11a also waits for the touch of the buttons B1 and B2. For example, when any of the buttons B1 and B2 is touched by the employee 21 and the button touch is detected by the touch panel 11g, the CPU 11a changes the total amount of money included in the payment information according to the instruction by the employee 21 after the touch. In such a waiting state, the CPU 11a may confirm occurrence of other events and perform other idle state processing. For example, while waiting, the CPU 11a may confirm whether the user code is acquired. In such a case, when the user code is acquired, the CPU 11a returns to a state waiting for Act 24 to Act 26 after performing the same processing as those of Act 7 and Act 8.

When the merchandise code is acquired, the CPU 11a determines that the result in Act 24 is Yes and proceeds to Act 27.

In Act 27, the CPU 11a activates the portion of the screen of the touch panel 11g as the registration screen, proceeds to Act 18 in FIG. 4, and repeats processing after Act 18 similar to the description described above.

In a case where the CPU 11a is waiting for Act 24 to Act 26, and button B3 is not touched, the CPU 11a determines that the result in Act 26 is Yes and proceeds to Act 28.

In Act 28, the CPU 11a increments a value of the variable m by 1 and proceeds to Act_29.

In Act 29, the CPU 11a clears the registration merchandise table.

Thereafter, the CPU 11a returns to Act 12 in FIG. 4 and repeats the processing after Act 12. Herewith, the CPU 11a subsequently generates a plurality of payment information, each corresponding to a different transaction in the consecutive transactions.

A new registered merchandise list can be started in the registration merchandise table without transferring payment information only when the consecutive flag is set. That is, when consecutive transaction processing is not selected, the CPU 11a prohibits the start of a new registered merchandise list until the payment information for the current transaction is transmitted. When consecutive transaction processing is selected, the CPU 11a permits the start of a new registered merchandise list without the payment information being transmitted, since the transaction counter m is incremented.

When the payment apparatus 12 is waiting for Act 24 to Act 26, the CPU 11a determines that the result in Act 25 is Yes and proceeds to Act 30. The employee 21 selects a payment apparatus 12 by touching any of the buttons B4 to B7 of the first selection screen SC3 or the second selection screen SC4. If the employee 21 touches one of the buttons B4 to B7 associated with a payment apparatus 12 that is not accepting transfer of payment information, the CPU 11a does not detect the button touch in Act_25. The CPU 11a does not accept selection of a payment apparatus 12 which cannot accept payment information. When no payment apparatus 12 can accept payment information, the CPU 11a does not wait for selection of a payment apparatus 12 in Act 24 to Act 26.

In Act 30, the CPU 11a confirms whether the point flag is set. When the point flag is set, the result is Yes and the CPU 11a proceeds to Act 31.

In Act 31, the CPU 11a adds the user code saved in the user code area to the payment information. In this case, the user code saved in the user code area is a user code acquired most recently by the card reader writer 11i. When a plurality of payment information is generated for a consecutive transaction, the CPU 11a adds the user code to each of the plurality of payment information. Thereafter, the CPU 11a proceeds to Act 32. When the point flag is not set, the result in Act 30 is No and the CPU 11a bypasses Act 31 and proceeds to Act 32.

In Act 32, the CPU 11*a* transfers the payment information to the designated payment apparatus 12. The payment information that is transferred in Act_32 is the payment information generated in Act 22 when the consecutive flag is not set, and one or all of the plurality of payment information generated in Act 20 when the consecutive flag is set. Even though the employee 21 issues the instruction to carryout the consecutive transaction, the employee 21 is able to issue the instruction to transfer the payment information after merchandise registration for a single transaction in the consecutive transaction is ended. Even when the consecutive flag is set, the payment information generated in Act 20 may be payment information for a single transaction in the consecutive transaction. Specifically, the CPU 11*a* controls the communication unit 11*j* to transmit the payment information to LAN 13 by setting the designated payment apparatus 12 as a destination. Herewith, the payment information is transmitted to the payment apparatus 12. The CPU 11*a* executes the control process based on the control program. Thus, the computer, which includes the CPU 11*a* as the main controller, cooperates with the communication unit 11*j* to function as a first transmission unit. When the user code is added to the payment information, the CPU 11*a* also transfers the user code to the payment apparatus 12. The CPU 11*a* executes the control process based on the control program. Thus, the computer, which includes the CPU 11*a* as the main controller, cooperates with the communication unit 11*j* to function as a second transmission unit.

In Act 33, the CPU 11*a* activates a portion of the screen of the touch panel 11*g* as a notification screen.

The notification screen is used for the employee 21 to recognize that the payment information is transferred to the payment apparatus 12 for semi-self-service payment. The semi-self-service payment executes payment processing in the payment apparatus 12 according to the operation by the shopper 22.

The notification screen may include the same contents without being dependent on the state of the consecutive flag or it may include different contents according to the state of the consecutive flag.

Figure 10:
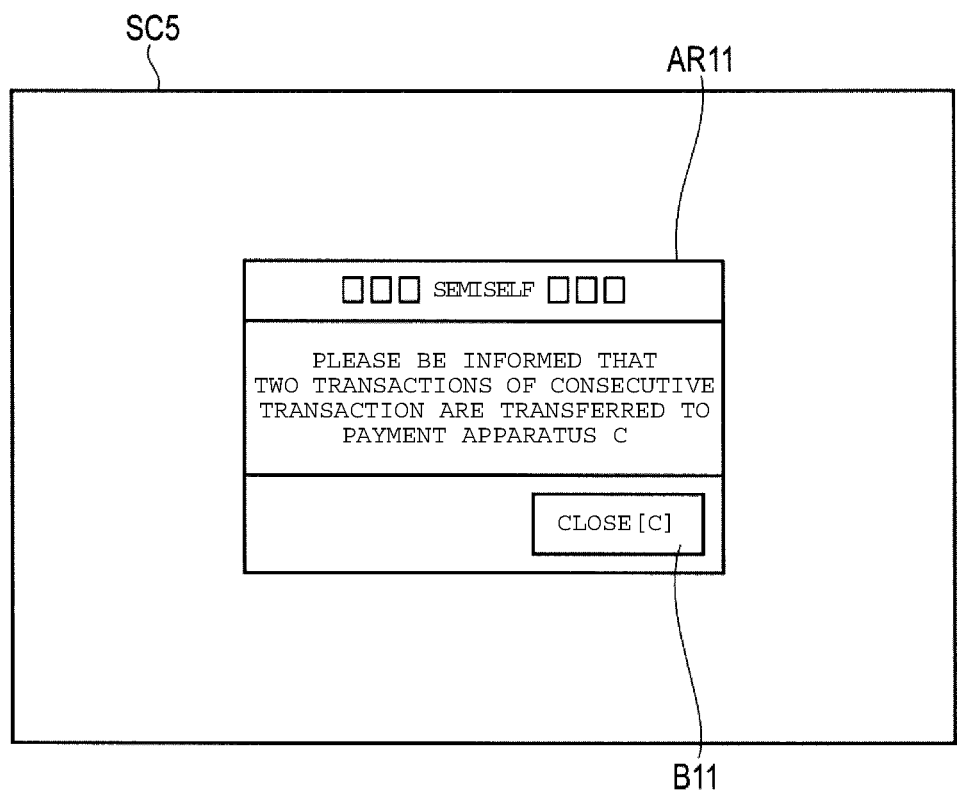
FIG. 10 illustrates an example of a notification screen.

FIG. 10 is a diagram illustrating an example of a notification screen SC5.

The notification screen SC5 includes the display areas AR11, AR12, and the button B11.

The display area AR11 represents an image for causing the employee 21 to recognize that the semi-self-service payment is selected. The display area AR12 represents an image for causing the employee 21 to recognize that the payment information of two transactions for the consecutive transaction are transferred to a specific payment apparatuses 12. That is, the notification screen SC5 corresponds to a screen that appears when the consecutive flag is set.

The button B11 is used for the employee 21 to instruct to close the notification screen SC5.

The CPU 11*a* returns to Act 1 in FIG. 3 according to the touch on the button B11 and repeats the processing after Act_1 similarly as in the description described above. That is, the CPU 11*a* ends the merchandise registration of the commercial transaction for a single shopper according to the touch on the button B11, and proceeds to the merchandise registration for another shopper 22.

Operation of Payment Apparatus 12

When the payment apparatus 12 is started, the CPU 12*a* starts a control process according to a control program stored in the ROM 12*b* or the auxiliary storage unit 12*d*.

Figure 11:
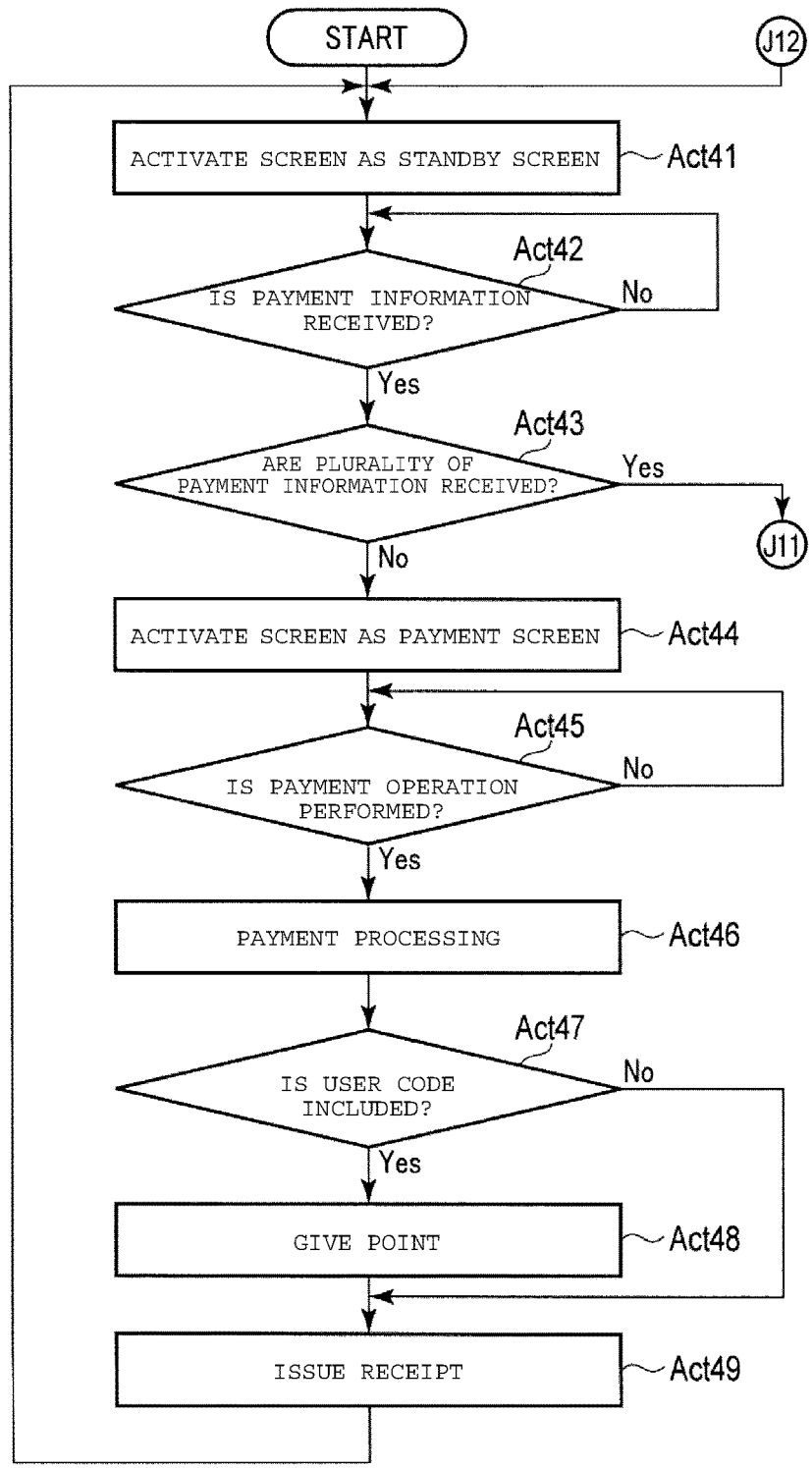
FIG. 11 is a flowchart of a control process of the CPU included in the payment apparatus of FIG. 2.
Figure 12:
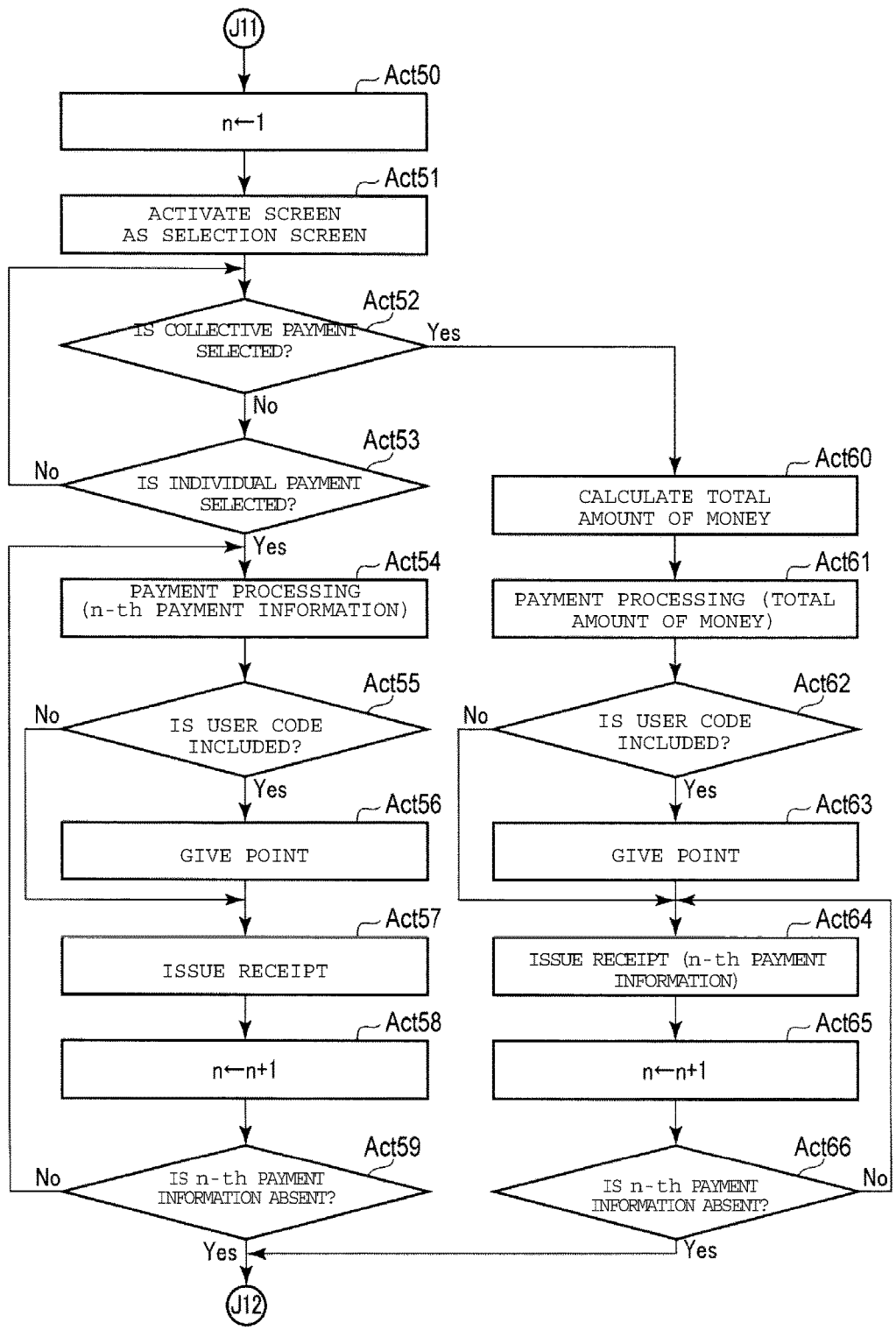
FIG. 12 is another flowchart of the control process of the CPU included in the payment apparatus of FIG. 2.

FIG. 11 and FIG. 12 are flowcharts of a control process of the CPU 12*a*.

In Act 41, the CPU 12*a* activates the screen of the touch panel 12*g* as a standby screen when no payment processing is happening. The contents of the standby screen may be determined arbitrarily. For example, a message indicating that payment processing is not available or any image displaying an advertisement or the like as a screen saver may be displayed.

In Act 42, the CPU 12*a* confirms whether the payment information is received. When the payment information is not received, the result is No and the CPU 12*a* repeats Act 42. In Act 42, the CPU 12*a* waits for reception of the payment information.

As described above, the communication unit 12*j* (of the payment apparatus 12 receiving payment information from the communication unit 11*j* of the merchandise registration apparatus 11 via the LAN 13) receives the payment information and saves the payment information in the RAM 12*c* or the auxiliary storage unit 12*d*. When a plurality of payment information is delivered to the communication unit 12*j*, the communication unit 12*j* receives all of the plurality of payment information in the RAM 12*c* or the auxiliary storage unit 12*d*. Accordingly, the CPU 12*a* determines that the result in Act 42 is Yes and proceeds to Act 43.

In Act 43, the CPU 12*a* confirms whether the plurality of payment information is received. When only a single payment information is received, the CPU 12*a* determines that the result in Act 43 is No and proceeds to Act 44.

In Act 44, the CPU 12*a* changes the screen of the touch panel 12*g* to the payment screen.

The payment screen accepts operation by the shopper 22 to perform payment processing based on the received single payment information. The payment screen represents at least, for example, the total amount of money indicated in the payment information. The payment screen may include the total number of items or a list of the purchased merchandise. When payment by a plurality of payment methods is permitted, the payment screen includes a button for selecting the payment method by the shopper 22 or the like.

In Act 45, the CPU 12*a* confirms whether the operation for payment processing by the shopper 22 is performed. When the operation is not performed, the result is No and the CPU 12*a* repeats Act 45. The CPU 12*a* waits for for payment processing in Act 45.

When the employee 21 who operates the merchandise registration apparatus 11 transfers the payment information to any of the payment apparatuses 12, the employee 21 notifies the shopper 22 that the payment is to be performed by the specific payment apparatus 12 which is the transfer destination. The shopper 22 who receives the notification moves to the designated payment apparatus 12 and performs the operation for the payment processing on the payment screen described above. The CPU 12*a* performs the payment processing as described above. When payment processing is detected by the touch panel 12*g*, the CPU 12*a* determines that the result in Act 45 is Yes and proceeds to Act 46.

In Act 46, the CPU 12*a* executes payment processing. Specifically, the CPU 12*a* calculates the total amount of money due for the registered merchandise indicated in the merchandise list included in the payment information which is saved in the RAM 12*c* or the auxiliary storage unit 12*d*. Otherwise, when the total amount of money is included in the payment information, no calculation by the CPU 12*a* is needed. When the CPU 12*a* calculates the total amount of money, the payment apparatus 12 is also referred to as an accounting apparatus. The CPU 12*a* settles the determined payment amount of money according to a payment method designated by the shopper 22. The payment method may be cash, a credit card, electronic money, or another method. In one example, a POS terminal or the like may be used for payment processing. The CPU 12a executes the control process based on the control program. Thus, the computer, which includes the CPU 12a as the main controller, functions as a payment section.

In Act 47, the CPU 12a confirms whether the user code is included in the payment information or not. When the user code is included in the payment information, the result is Yes and the CPU 12a proceeds to Act 48.

In Act 48, the CPU 12a gives points to the shopper 22 in accordance with the contents of the commercial transaction. Specifically, for example, the CPU 12a determines the points acquired in the current commercial transaction according to a result of the payment processing in Act 46. The CPU 12a adds the acquired points to the present point balance associated with the user code, which is included in the payment information. For example, the CPU 12a may transmit the user code and acquired points to a point server (not illustrated).

Thereafter, the CPU 12a proceeds to Act 49. When the user code is not included in the payment information, the result in Act 47 is No and the CPU 12a bypasses Act 48 and proceeds to Act 49.

In Act 49, the CPU 12a controls the printer 12h and issues a receipt which represents the information indicated in the payment information which is saved in the RAM 12c or the auxiliary storage unit 12d, a result of the payment processing or the like. Thereafter, the CPU 12a returns to Act 41 and performs processing after Act 41 similarly as in the description described above.

On the other hand, when the plurality of payment information is received, the result in Act 43 is Yes and the CPU 12a proceeds to Act 50 of FIG. 12.

In Act 50, the CPU 12a sets "1" as a value of a variable n.

In Act 51, the CPU 12a activates a portion of the screen of the touch panel 11g as a selection screen. The selection screen is used for the shopper 22 to select individual payment Or collective payment. The individual payment option represents a payment form in which payment is individually performed in accordance with each of the plurality of payment information of a consecutive transaction. The collective payment represents a payment form in which payment processing is collectively performed in accordance with the plurality of payment information.

In Act 52, the CPU 12a confirms whether the collective payment is selected. When the collective payment is not selected, the result is No and the CPU 12a proceeds to Act 53.

In Act 53, the CPU 12a confirms whether individual payment is selected. When the individual payment is not selected, the result is No and the CPU 12a proceeds to Act 52.

The CPU 12a waits for selection of the collective payment or the individual payment option in Act 52 to Act 53. The CPU 12a may perform other operations or idle state processing while waiting.

When individual payment is selected, the CPU 12a determines that the result in Act 53 is Yes and proceeds to Act 54.

In Act 54, the CPU 12a executes payment processing based on the n-th payment information and proceeds to Act_55.

In Act 55, the CPU 12a confirms whether the user code is included in the n-th payment information. When the user code is included in the n-th payment information, the result is Yes and the CPU 12a proceeds to Act 56.

In Act 56, the CPU 12a gives points to the shopper 22 according to the commercial transaction, similar to Act 48.

Thereafter, the CPU 12a proceeds to Act 57. When the user code is not included in the n-th payment information, the result in Act 55 is No and the CPU 12a bypasses Act 56 and proceeds to Act 57.

In Act 57, the CPU 12a controls the printer 12h and issues a receipt which represents the information indicated in the n-th payment information and a result of the payment processing or the like.

In Act 58, the CPU 12a increments the value of the variable n by 1.

In Act 59, the CPU 12a confirms whether the n-th payment information is present in the payment information saved in the RAM 12c or the auxiliary storage unit 12d or not. When the n-th payment information is present, the CPU 12a returns to Act 54 and performs the processing from Act 54 to Act 57 on the payment information. The CPU 12a subsequently performs the processing from Act 54 to Act 57 on each of the plurality of received payment information. Furthermore, if the user code is acquired when performing merchandise registration, the same user code is included in each of the plurality of payment information. Accordingly, when the CPU 12a subsequently performs Act 54 to Act 57 on the plurality of payment information, points are given to the same point account for each of the plurality of payment information.

When Act 54 to Act 57 is ended on each of the payment information saved in the RAM 12c or the auxiliary storage unit 12d, the CPU 12a determines that the result in Act 59 is Yes and returns to Act 41 in FIG. 11 and waits for reception of a new payment information.

As such, when individual payment is selected by the shopper 22, the CPU 12a subsequently performs the payment processing for each individual payment information and issues a receipt each time payment processing is performed.

On the other hand, when collective payment is selected, the CPU 12a determines that the result in Act 52 is Yes and proceeds to Act 60.

In Act 60, the CPU 12a calculates a total amount of money due for all of the registered merchandise in all of the plurality of payment information which are saved in the RAM 12c or the auxiliary storage unit 12d.

In Act 61, the CPU 12a executes payment processing for settling the total amount of money.

In Act 62, the CPU 12a confirms whether the user code is included in the n-th payment information or not. When the user code is included in the n-th payment information, the result is Yes and the CPU 12a proceeds to Act 63.

In Act 63, the CPU 12a gives points to the shopper 22 according to the commercial transaction. Specifically, for example, the CPU 12a determines the acquired points related to all transactions of the current consecutive transaction. The CPU 12a adds the acquired points to the point balance associated with the user code included in a payment information of the consecutive transaction.

Thereafter, the CPU 12a proceeds to Act 64. When the user code is not included in the payment information, the result in Act 62 is No and the CPU 12a bypasses Act 63 and proceeds to Act 64.

In Act 64, the CPU 12a controls the printer 12h and issues a receipt which represents the information indicated in the n-th payment information and a result of the payment processing or the like.

In Act 65, the CPU 12a increments the value of the variable n by 1.

In Act 66, the CPU 12a confirms whether the n-th payment information is present in the payment information saved in the RAM 12c or the auxiliary storage unit 12d. When the n-th payment information is present, the CPU 12a returns to Act 64.

As such, when collective payment is selected, the CPU 12a settles the total amount of money at one time based on all the payment information for the consecutive transaction. The CPU 12a subsequently issues the receipt according to each of the plurality of payment information. Furthermore, when the user code is acquired during merchandise registration, the points are given to the point account indicated in the payment information for the consecutive transaction.

When the execution of the processing Act 64 on all of the payment information saved in the RAM 12c or the auxiliary storage unit 12d is ended, the CPU 12a determines that the result in Act 66 is Yes and returns to Act 41 in FIG. 11 to wait for reception of a new payment information.

As described above, in the merchandise registration apparatus 11, when the shopper 22 desires to apply the point service when a consecutive transaction is performed, a single user code acquired by the card reader writer 11i is included in each of plurality of payment information generated in the consecutive transaction. In the payment apparatus 12, when the plurality of payment information are received and the user code is included in the plurality of payment information, a point is given to a point account related to the user code, that is, the same point account for each payment information. The CPU 12a executes the control process based on the control program. Thus, the computer, which includes the CPU 12a as the main controller, functions as a processing unit. Here, the processing of Act 56 and Act 63 correspond to processing for applying the service to the commercial transaction based on the user code.

According to the checkout system 100, even when the point service is applied in each of a plurality of commercial transactions of the consecutive transaction, the user code is acquired by the merchandise registration apparatus 11 only once, reducing time and effort of the operator.

According to the checkout system 100, the user code that is used for applying points may be entered or changed by the employee 21 or the shopper 22 any time before the subtotal button is touched.

The following various modifications may be made in the embodiment.

The user code may be transmitted from the merchandise registration apparatus 11 to the payment apparatus 12 without being included in the plurality of payment information. Alternatively, the payment information including a plurality of merchandise lists and a single user code may be transmitted from the merchandise registration apparatus 11 to the payment apparatus 12.

The service which is in association with the user code may include various services such as, for example, an electronic receipt service, a discount service applicable when no shopping bag is required, a stockholder preferential service, a discount service for senior citizens, or the like.

The commercial transaction is not limited to buying and selling of the merchandise. Accordingly, merchandise is not limited to an article and may be a service. The "purchased merchandise" may indicate a service provided at a cost from a provider to a beneficiary.

The present application is able to be applied to a POS terminal or a cash register in which the employee 21 performs the operation for registration of merchandise and payment or another type of system such as a self POS terminal in which the shopper 22 performs the operation for registration of merchandise and payment. The checkout system may be implemented as a single independent apparatus without being limited to a form implemented by a combination of plurality of apparatuses in the embodiment described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A checkout system including a registration apparatus and at least one payment apparatus, comprising:
an input apparatus in the registration apparatus arranged at a store, by which a first input indicating that a plurality of transactions is consecutively performed by a customer is input, a second input indicating that one of the consecutive transactions is completed is input, and a third input for proceeding to payment process for each of the consecutive transactions is input; and
a controller in the registration apparatus, configured to:
obtain a user code assigned to the customer;
upon receipt of the first input, set a flag stored in a memory to a first value; and
when the flag is set to the first value, generate payment information indicating a total amount to be paid for one of the consecutive transactions every time the second input is received, and upon receipt of the third input, cause the payment apparatus arranged at the store to:
apply a service associated with the obtained user code to payment processing for each of the plurality of transactions, and
perform the payment processing with respect to each of the plurality of transactions based on the corresponding payment information, in accordance with a payment operation of the customer on the payment apparatus.

2. The system according to claim 1, wherein the service is at least one of a discount service, a points service, and an electronic receipt service.

3. The system according to claim 1, wherein:
upon receipt of the third input, the controller of the registration apparatus transmits the payment information for each transaction of the plurality of transactions to the payment apparatus.

4. The system according to claim 1, wherein:
the checkout system includes a plurality of payment apparatuses,
the controller of the registration apparatus is configured to select one of the payment apparatuses, and
the controller of the registration apparatus transmits the payment information for each transaction of the plurality of transactions to the selected payment apparatus out of the plurality of payment apparatuses.

5. The system according to claim 1, wherein the payment apparatus transmits the user code in connection with information regarding each of the plurality of transactions to a server.

6. The system according to claim 1, wherein
the checkout system includes a plurality of payment apparatuses arranged at the store, and
the controller of the registration apparatus is configured to display a screen in which one of the payment apparatuses is selected.

7. The system according to claim 6, wherein
the screen shows a status of each of the payment apparatuses.

8. A checkout method comprising:
receiving, via an input apparatus of a registration apparatus arranged at a store, an input of a user code corresponding to a customer;
receiving, via the input apparatus, a first input indicating that a plurality of transactions is consecutively performed by the customer;
upon receipt of the first input, setting, by a first processor of the registration apparatus, a flag stored in a memory to a first value; and
when the flag is set to the first value,
generating, by the first processor, payment information indicating a total amount to be paid for one of the consecutive transactions every time receiving a second input indicating that the one of the transactions is completed;
upon receipt of a third input for proceeding to payment process of each of the consecutive transactions, applying, by a second processor of a payment apparatus arranged at the store, a service associated with the received user code to payment processing for each of the transactions, and
performing, by the second processor, the payment processing for each of the plurality of transactions for the customer, based on the corresponding payment information in accordance with a payment operation of the customer on the payment apparatus.

9. The method according to claim 8, wherein the service is at least one of a discount service, a points service, and an electronic receipt service.

10. The method according to claim 8, further comprising:
upon receipt of the third input, transmitting the payment information from the registration apparatus to the payment apparatus.

11. The method according to claim 8, further comprising:
selecting one of a plurality of payment apparatuses for the payment processing for the transactions; and
transmitting the generated payment information to the selected apparatus out of the plurality of payment apparatuses.

12. The method according to claim 8, further comprising:
transmitting the user code in connection with information regarding each of the plurality of transactions from the payment apparatus to a server.

13. The method according to claim 8, further comprising:
displaying on a display of the registration apparatus a screen in which one of a plurality of payment apparatuses arranged at the store is selected.

14. The method according to claim 13, wherein
the screen shows a status of each of the payment apparatuses.

15. A checkout system comprising:
at least one registration apparatus arranged at a store; and
at least one payment apparatus arranged at the store, wherein the at least one registration apparatus includes:
a first communication unit,
a first input apparatus by which a first input indicating that a plurality of transactions is consecutively performed by a customer is input, a second input indicating that one of the consecutive transactions is completed is input, and a third input for proceeding to payment process for each of the consecutive transactions is input,
and
a first controller configured to:
obtain a user code assigned to the customer;
upon receipt of the first input, set a flag stored in a memory to a first value; and
when the flag is set to the first value, generate payment information indicating a total amount to be paid for one of the consecutive transactions every time the second input is received, and
upon receipt of the third input, control the first communication unit to transmit the payment information in association with the obtained user code for each transaction of the plurality of transactions, and
the at least one payment apparatus includes
a second communication unit, and
a second controller configured to:
upon receipt of the payment information from the registration apparatus via the second communication unit, apply a service associated with the user code to payment processing for each of the transactions, and
perform payment processing for each of the plurality of transactions based on the corresponding payment information, in accordance with a payment operation of the customer on the payment apparatus.

16. The system according to claim 15, wherein the service is at least one of a discount service, a points service, and an electronic receipt service.

17. The system according to claim 15, wherein:
the checkout system comprises a plurality of payment apparatuses,
the first controller is configured to select one of the payment apparatuses for transmitting the generated payment information, and
the registration apparatus transmits the generated payment information to the selected payment apparatus out of the plurality of payment apparatuses.

18. The system according to claim 15, wherein the second controller is configured to control the second communication unit to transmit the user code in connection with information regarding each of the plurality of transactions from the payment apparatus to a server.

19. The system according to claim 15, wherein
the checkout system includes a plurality of payment apparatuses arranged at the store, and
the first controller of the registration apparatus is configured to display a screen in which one of the payment apparatuses is selected.

20. The system according to claim 19, wherein
the screen shows a status of each of the payment apparatuses.

* * * * *